US011124198B2

(12) United States Patent
Higashitani et al.

(10) Patent No.: US 11,124,198 B2
(45) Date of Patent: Sep. 21, 2021

(54) MATERIAL ACCUMULATION DETECTION DEVICE AND METHOD THEREOF

(71) Applicant: DENSO CORPORATION, Kariya (JP)

(72) Inventors: Mitsuharu Higashitani, Kariya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 293 days.

(21) Appl. No.: 16/352,079

(22) Filed: Mar. 13, 2019

(65) Prior Publication Data

US 2019/0291740 A1 Sep. 26, 2019

(30) Foreign Application Priority Data

Mar. 26, 2018 (JP) .............................. JP2018-058337

(51) Int. Cl.
*B60W 50/00* (2006.01)

(52) U.S. Cl.
CPC ..... *B60W 50/0098* (2013.01); *B60W 2555/20* (2020.02)

(58) Field of Classification Search
CPC ........... B60W 50/0098; B60W 2555/20; G01S 17/86; G01S 17/931; G01S 7/497; G01S 2007/4975
See application file for complete search history.

(56) References Cited

U.S. PATENT DOCUMENTS

| 8,704,653 B2* | 4/2014 | Seder ................ G01S 13/723 340/461 |
| 9,767,516 B1* | 9/2017 | Konrardy ............ G06Q 10/0635 |
| 2010/0315218 A1* | 12/2010 | Cades .................. B60K 35/00 340/441 |
| 2014/0058711 A1* | 2/2014 | Scofield ............... G06Q 10/04 703/6 |
| 2015/0088374 A1* | 3/2015 | Yopp ...................... B60S 1/04 701/36 |
| 2017/0113689 A1* | 4/2017 | Gordon ............... B60W 40/04 |
| 2018/0059661 A1* | 3/2018 | Sato ..................... B60W 40/04 |
| 2018/0093663 A1* | 4/2018 | Kim ..................... G08G 1/168 |
| 2018/0229692 A1* | 8/2018 | Li ....................... B60S 1/0818 |
| 2018/0257668 A1* | 9/2018 | Tonshal ................ G06F 1/163 |
| 2018/0370502 A1* | 12/2018 | Wang .................... G08G 1/163 |

FOREIGN PATENT DOCUMENTS

JP    2013-020288 A    1/2013

OTHER PUBLICATIONS

Boondoggle, "Boondoggle wakes employees earlier in extreme winter weather with Winter Wake Up app," Dec. 14, 2011, https://press.boondoggle.eu/boondoggle-wakes-employees-earlier-in-extreme-winter-weather-with-the-winter-wake-up-app (Year: 2011).*

* cited by examiner

*Primary Examiner* — Donald J Wallace
*Assistant Examiner* — Daniel M. Robert
(74) *Attorney, Agent, or Firm* — Oliff PLC

(57) ABSTRACT

In an ECU mounted on an own vehicle having a display device or a speaker device, a first acquisition part acquires external environment information outside of the own vehicle. A detection part detects whether the own vehicle has entered a first state based on the acquired external environment information, the first state represents accumulation of snowfall which prevents the own vehicle from performing smooth driving. An information control part instructs the display unit or the speaker device to provide information that the own vehicle has entered the first state to a user of the own vehicle.

10 Claims, 13 Drawing Sheets

MATERIAL ACCUMULATION DETECTION DEVICE AND METHOD THEREOF

CROSS-REFERENCE TO RELATED APPLICATION

This application is related to and claims priority from Japanese Patent Application No. 2018-58337 filed on Mar. 26, 2018, the contents of which are hereby incorporated by reference.

TECHNICAL FIELD

The present disclosure relates to material accumulation detection devices and methods thereof which detect whether accumulation of material derived from an external environment, has occurred or will occur on a vehicle.

BACKGROUND

There have been used material accumulation detection devices to be mounted on vehicles, which predict a driving road condition, whether a road surface will be frozen and the driving road of a vehicle will become a poor driving condition, on the basis of snowfall and temperature information. The material accumulation detection device instructs a display device of a vehicle to display, and the user of the vehicle to input a detour route through an input window on the display device. However, there is no device to detect whether accumulation of material derived from the external environment has occur or will occur on the vehicle.

SUMMARY

It is desired for the present disclosure to provide a material accumulation detection device as an exemplary embodiment. The material accumulation detection device is mounted on an own vehicle, for example. The own vehicle is equipped with an information device, etc. The material accumulation detection device detects accumulation of material derived from external environment outside of the own vehicle. There are snow, ash, sand (sand particles, sand powder), etc. as the material derived from the external environment. The material accumulation detection device has a computer system including a central processing unit. The computer system provides a first acquisition part, a detection part, and an information control part. The first acquisition part acquires external environment information outside of the own vehicle. The detection part detects whether the own vehicle has entered a first state on the basis of the acquired external environment information. The first state represents an accumulation of material which prevents the own vehicle from performing smooth driving. The material is derived from the external environment of the own vehicle. The information control part instructs the information device to provide information that the own vehicle has entered the first state.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
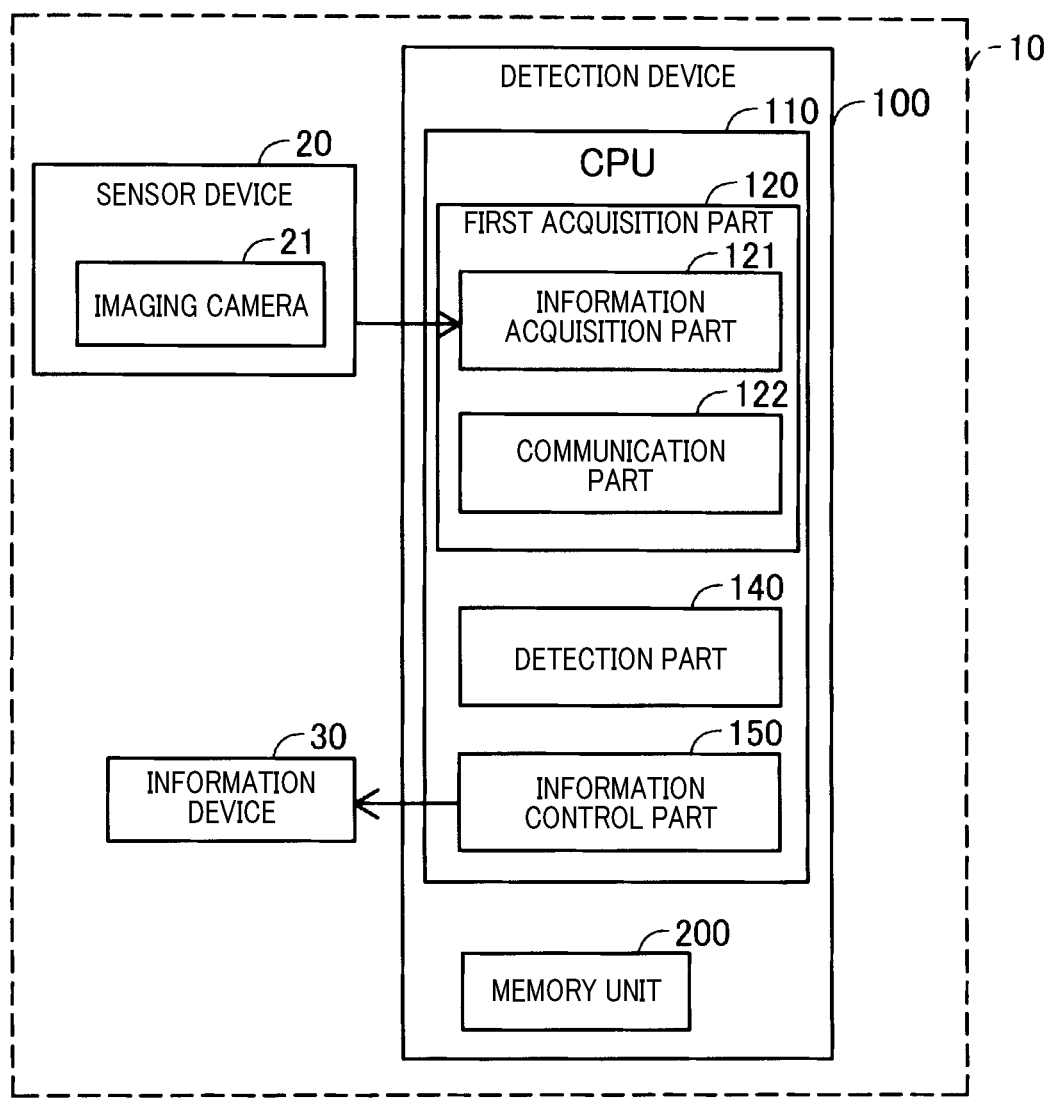
FIG. 1 is a block diagram showing a schematic structure of a material accumulation detection device according to a first exemplary embodiment of the disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of a material accumulation detection device 100 and a detection method according to a first exemplary embodiment with reference to FIG. 1 to FIG. 5.

FIG. 1 is a block diagram showing a schematic structure of the material accumulation detection device 100 according to the first exemplary embodiment of the disclosure. As shown in FIG. 1, the material accumulation detection device 100 according to the first exemplary embodiment is mounted on the own vehicle 10 equipped with a sensor device 20, an information device 30. The material accumulation detection device 100 is mounted on an own vehicle 10.

The sensor device 10 has an imaging camera 21. The imaging camera 21 is arranged at the inside of the own vehicle 10 and captures a forward view image of the own vehicle 10 in the direction to outside from the windshield glass 12 of the own vehicle 10. That is, the imaging camera 21 captures the forward view image of the own vehicle 10.

The material accumulation detection device 100 according to the first exemplary embodiment of the present disclosure is composed of an electronic control unit (ECU). The ECU forming the material accumulation detection device 100 is composed of a central processing unit (CPU) 110, a memory unit 200, an input/output interface (I/O interface, not shown), etc. The memory unit 200 is composed of a read only memory (ROM), a random access memory (RAM), etc.

The ECU as the material accumulation detection device 100 executes programs stored in the memory unit 200 or the non-transitory computer readable storage medium so as to provide functions of an information acquisition part 121, a communication part 122, a detection part 140 and an information control part 150.

The information acquisition part 121 and the communication part 122 acquire external environment information which represents external environment information outside of the own vehicle 10.

The information acquisition part 121 receives detection results detected by the sensor device 20 and uses the received detection results as external environment information.

The communication part 122 receives position information of the own vehicle 10 through a global navigate satellite system sensor (GNSS sensor, not shown), and receives, as the external environment information of the own vehicle 10, weather information, i.e. snowfall amount information, temperature information, etc. of the area around the own vehicle 10 during a predetermined period in the past.

The predetermined period in the past represents a period until the current time from a time when an engine system of the own vehicle 10 has stopped or the user of the own vehicle 10 has turned on the ignition key.

The GNSS sensor is composed of a global positioning system sensor (GPS sensor). The GPS sensor receives electromagnetic waves transmitted from a satellite having a GPS, and detects a current location of the own vehicle 100 on the basis of the received electromagnetic waves.

The information acquisition part 121 and the communication part 122 correspond to, i.e. form a first acquisition part 120. The material accumulation detection device 100 has at least one of the information acquisition part 121 and the communication part 122. In other words, it is sufficient for the material accumulation detection device 100 to receive external environment information transmitted from at least one of the information acquisition part 121 and the communication part 122. For example, it is acceptable for the material accumulation detection device 100 to have the communication part 122 without mounting the sensor device 20 and information acquisition part 121 on the own vehicle 10.

The detection part 140 detects whether the own vehicle 10 has entered a first state on the basis of the external environment information acquired by the first acquisition part 120. The first state represents that material derived from the external environment has been accumulated on the own vehicle 10 and the accumulation of the material prevents the own vehicle 10 from performing smooth driving. For example, there are snow, frozen water, ash, sand (sand particles, sand powder), etc. as the material derived from the external environment around the own vehicle 10.

When the detection result of the detection part 140 indicates that the own vehicle 10 has entered the first state, the information control part 150 transmits the detection result of the detection part 140 to the information device 30. The information device 30 is composed of a display device, speakers, etc. using image and audio information so as to inform various information regarding the condition of the own vehicle 10 to the user (driver) and occupants in the own vehicle 10. In the first exemplary embodiment, the information device 30 is arranged inside of the compartment of the own vehicle 10. The display device is a head-up display (HUD) and a display device mounted on an instrument panel arranged on a dashboard of the own vehicle 10. The image information contains motion video and a character string.

A description will now be given of the detection process performed by the material accumulation detection device 100 with reference to FIG. 2.

Figure 2:
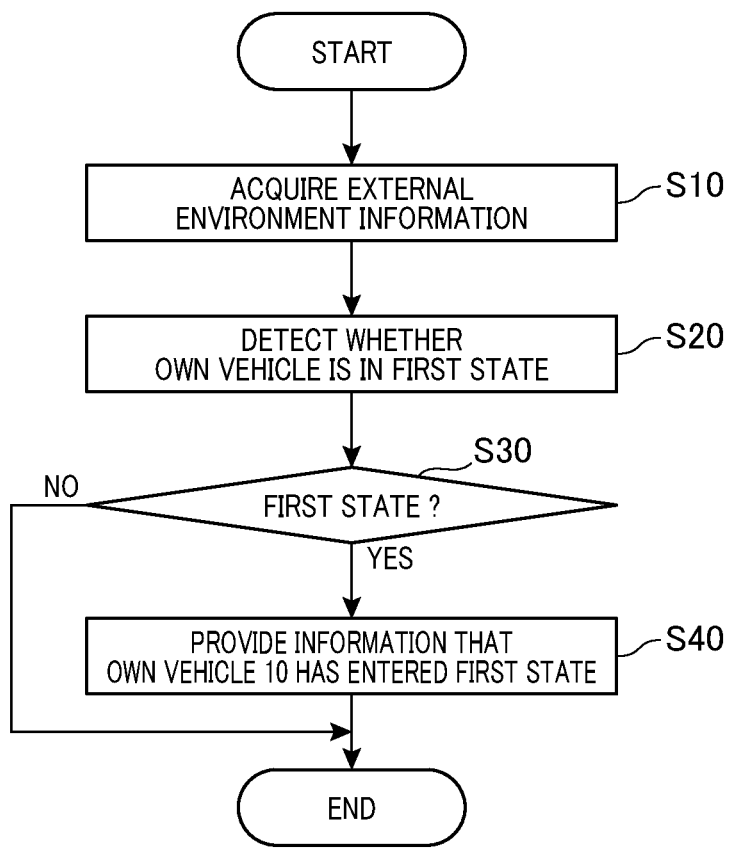
FIG. 2 is a flow chart showing a detection process performed by the material accumulation detection device according to the first exemplary embodiment shown in FIG. 1.

FIG. 2 is a flow chart showing the detection process performed by the material accumulation detection device 100 according to the first exemplary embodiment shown in FIG. 1. The material accumulation detection device 100 starts the detection process when the engine system of the own vehicle 10 is started or when the user of the own vehicle 10 turns on the ignition key of the own vehicle 10.

In step S10 shown in FIG. 2, the first acquisition part 120 (which is composed of the information acquisition part 121 and the communication part 122) acquires external environment information. The operation flow progresses to step S20.

In step S20, the detection part 140 detects whether the own vehicle 10 has entered the first state on the basis of the acquired external environment information.

When the detection result in step S20 is negative ("NO" in step S20), i.e. represents that the own vehicle 10 has not enter the first state, the CPU 110 in the ECU as the material accumulation detection device 100 finishes the detection process shown in FIG. 2. As will be explained later, when the information device 30 has informed various information regarding the condition of the own vehicle 10 to the user (driver) and occupants, the CPU 110 in the ECU as the material accumulation detection device 100 finishes the detection process.

Figure 3:
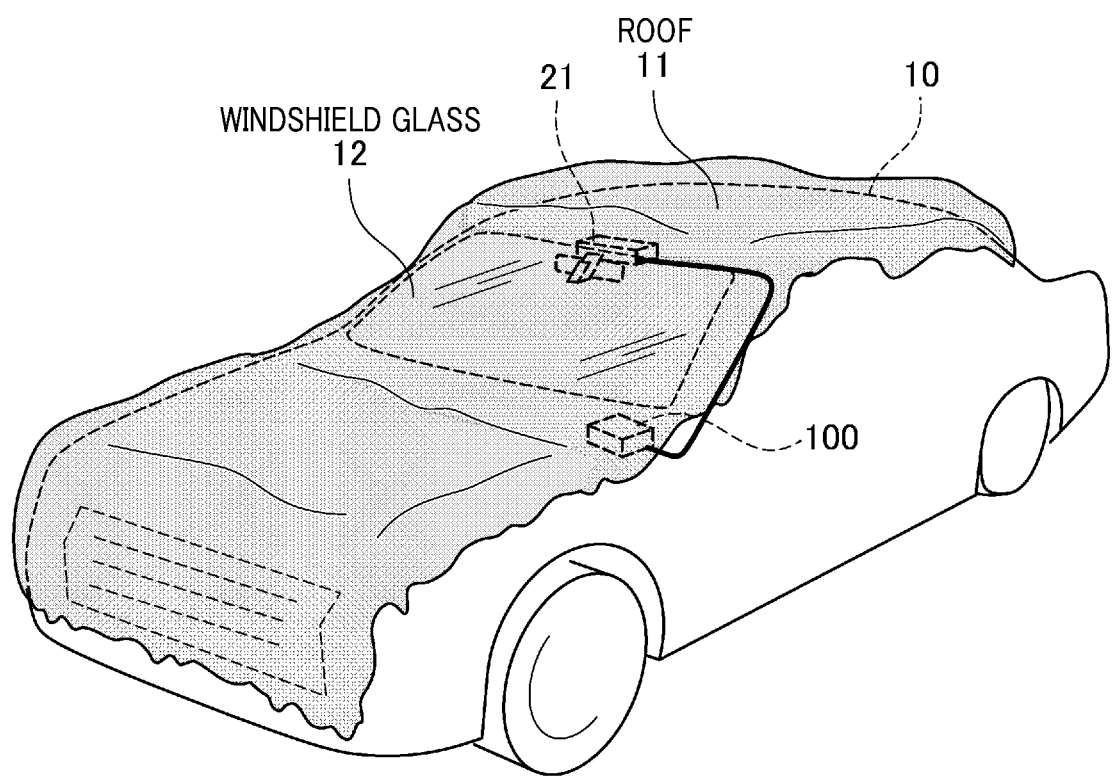
FIG. 3 is a view showing a situation in which snowfall has been accumulated to substantially cover an own vehicle.

FIG. 3 is a view showing a situation in which snowfall has been accumulated on the overall own vehicle. The first state of the own vehicle 10 represents a situation in which it is difficult for the material accumulation detection device 100 to detect an object ahead of the own vehicle 10.

When the own vehicle 10 in the first state shown in FIG. 3 in which the detection part 140 in the material accumulation detection device 100 of the own vehicle 10 cannot acquire a forward view image ahead of the own vehicle 10 because the overall own vehicle is covered with snow.

The detection part 140 determines that the own vehicle 10 is in the first state when it is difficult for the imaging camera 21 to capture a front image ahead of the own vehicle 10. It is acceptable for the detection part 140 to detect the occurrence of the first state of the own vehicle without using the detection results of the imaging camera 21 on the basis of external environment information obtained by the communication part 122 and a relationship between external environment and an amount of snow when the own vehicle 10 enters the first state.

Figure 4:
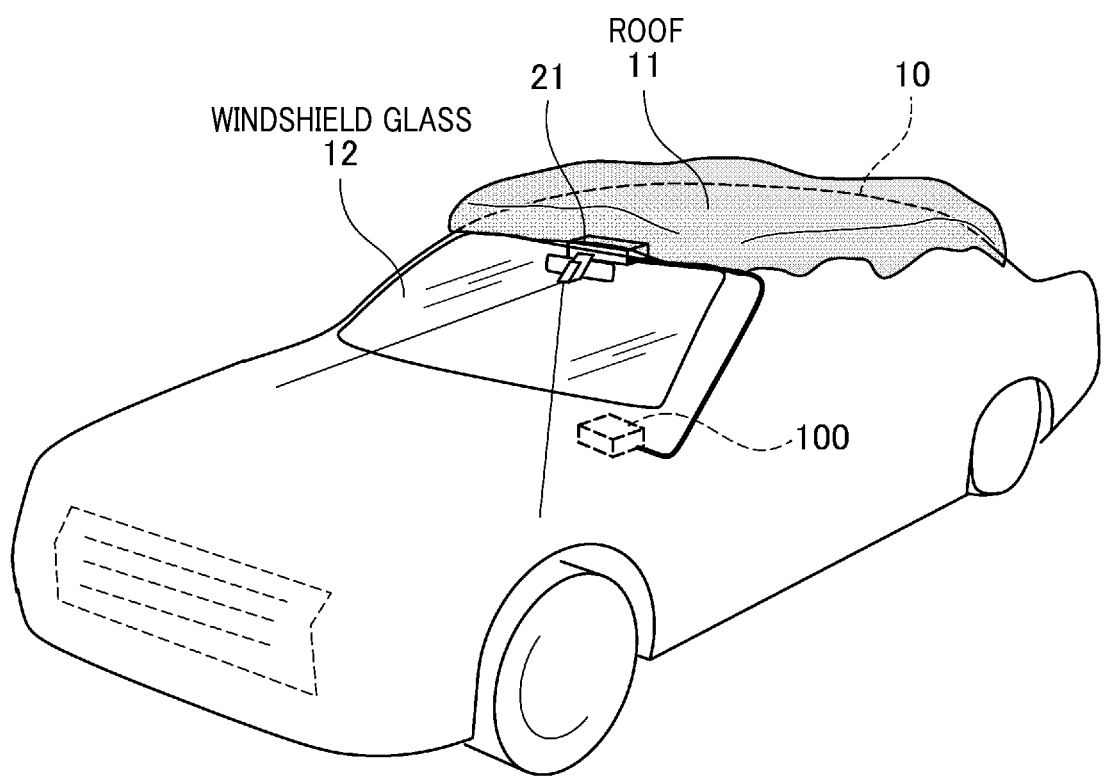
FIG. 4 is a view showing a situation in which snowfall has been accumulated on only a roof of the own vehicle.

FIG. 4 is a view showing a situation in which snowfall has been accumulated on only a roof 11 of the own vehicle 10.

It is acceptable for the detection part 140 to detect that the own vehicle 10 is in the first state when snowfall, ash, etc. has been accumulated on the roof 11 of the own vehicle 10 regardless of the situation in which the windshield glass 12 of the own vehicle 10 has been covered with snow, etc.

Figure 5:
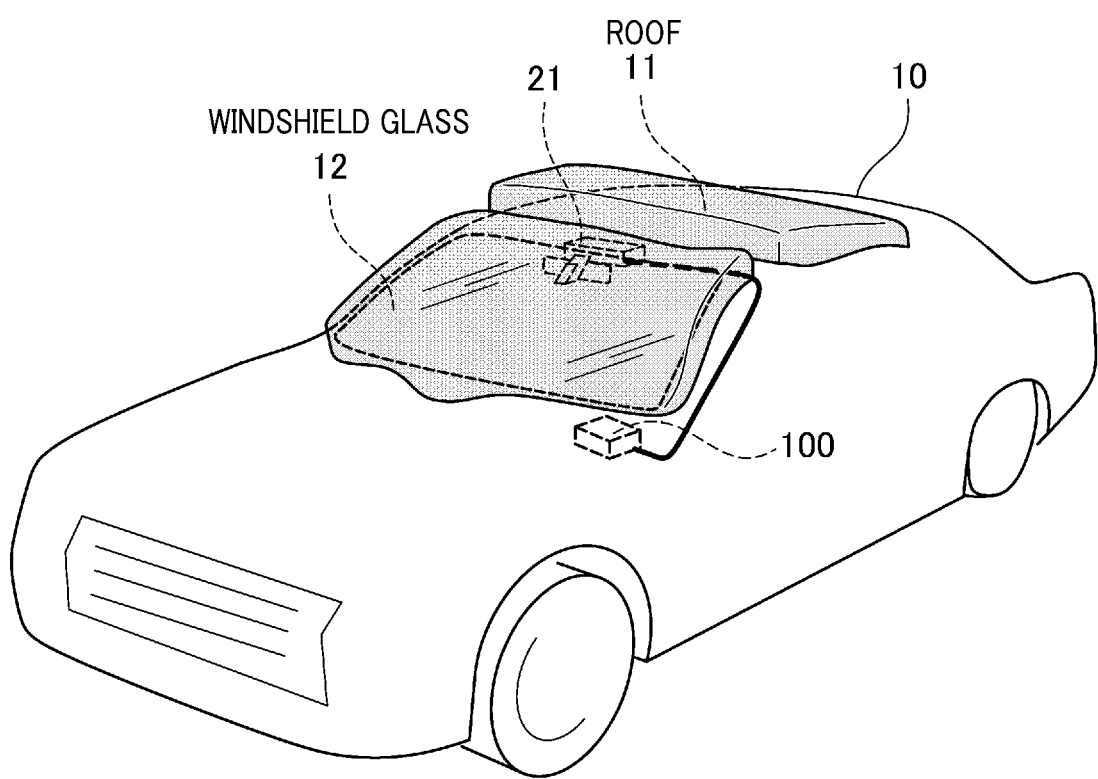
FIG. 5 is a view showing a situation in which snowfall accumulated on the roof of the own vehicle moves toward a windshield glass.

FIG. 5 is a view showing a situation in which snowfall accumulated on the roof 11 of the own vehicle 10 moves toward the windshield glass 12. As shown in FIG. 5, there may occur a possible case in which it becomes difficult for the user of the own vehicle 10 to perform smooth and safe driving when snowfall accumulated on the roof 11 of the own vehicle moves to the windshield glass 12 due to the braking operation of the user of the own vehicle 10.

Further, it is acceptable for the detection part 140 to detect that snowfall, ash, etc., satisfying entry to the first state has been accumulated on the own vehicle 10 on the basis of a shape of the roof 11 and a shape of the windshield glass 12 in addition to the external environment information obtained by the communication part 122 and a relationship between external environment and an amount of snow when the own vehicle 10 enters the first state.

When the detection result in step S30 shown in FIG. 2 is positive ("YES" in step S30), i.e. represents that the own vehicle 10 has entered the first state, the operation flow progresses to step S40.

In step S40, the information control part 150 instructs the information device 30 to inform that the own vehicle 10 has entered the first state.

When detecting that the own vehicle 10 has entered the first state on the basis of the external environment information obtained by the communication part 122, it is acceptable for the information control part 150 to instruct the information device 30 to provide, to the user of the own vehicle 10, information or a warning that there is a probability that material, i.e. snowfall, frozen water, ash, sand (sand particles, sand powder), etc., has been accumulated on the own vehicle 10, a probability that the material has been accumulated on the roof 11 of the own vehicle 10, and a risk that the material accumulated on the roof 11 will move toward the windshield glass 12 of the own vehicle 10.

Further, when the imaging camera 21 does not provide front image information to the material accumulation detection device 100, it is acceptable for the information control part 150 to instruct the information device 30 to provide to the user of the own vehicle 10 information regarding a probability that snowfall, etc. has been accumulated on the windshield glass 12 of the own vehicle 10.

As previously described, because the detection part 140 detects whether the own vehicle 10 has entered the first state on the basis of the external environment information, and the information control part 150 transmits the information regarding the first state of the own vehicle 10 to the information device 30, it is possible for the user of the own vehicle 10 to receive correct information regarding a probability for the own vehicle 10 entry to the first state due to accumulation of materials, for example snowfall, etc. derived from the external environment around the own vehicle 10. This makes it possible to allow the user of the own vehicle 10 to make countermeasure, for example, to remove snowfall accumulated on the own vehicle 10. Further, this makes it possible to provide warning to a user (driver) of the own vehicle with less chance of driving and a user with less chance of driving on a snow road.

In the structure of the material accumulation detection device 100 according to the first exemplary embodiment previously described, the information control part 150 instructs the information device 30 to provide the situation of the own vehicle 10 to the user of the own vehicle 10 when it is detected that the own vehicle 10 has entered the first state which also includes a situation in which snowfall, etc. accumulated on the roof 11 will move toward the windshield glass 12 of the own vehicle 10. This makes it possible for the user of the own vehicle 10 to know and predict a risk that the user of the own vehicle may not be able to correctly see and recognize the area in front of the own vehicle 10 through the windshield glass 12.

Second Exemplary Embodiment

A description will be given of a material accumulation detection device 100a and the detection method according to a second exemplary embodiment with reference to FIG. 6 to FIG. 7.

Figure 6:
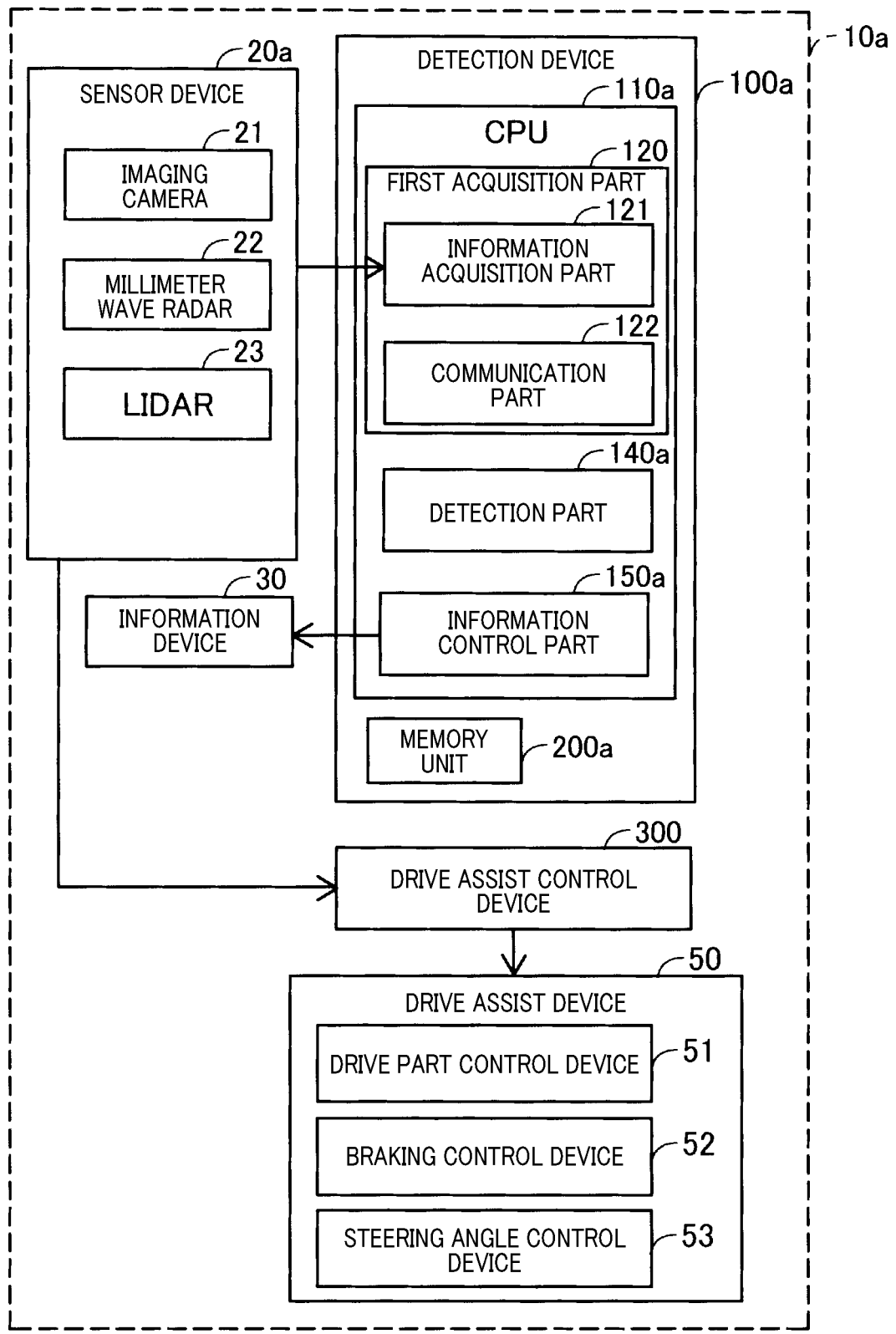
FIG. 6 is a block diagram showing a schematic structure of the material accumulation detection device according to a second exemplary embodiment of the disclosure.

FIG. 6 is a block diagram showing a schematic structure of the material accumulation detection device 100a according to the second exemplary embodiment of the disclosure. The same components between the second exemplary embodiment and the first exemplary embodiment will be referred to the same reference numbers and characters. The explanation of the same components is omitted here for brevity.

As shown in FIG. 6, the material accumulation detection device 100a according to the second exemplary embodiment is mounted on the own vehicle 10a. That is, the own vehicle 10a has the material accumulation detection device 100a, a sensor device 20a, the information device 30, a drive assist device 50, a drive assist control device 300. The drive assist control device 300 controls the behavior of the drive assist device 50.

The sensor device 20a has the imaging camera 21, a millimeter wave radar 22, a light detection and ranging (LIDAR) 23.

The imaging camera 21 is a monocular camera arranged at the inside of the own vehicle 10a and captures a forward view image ahead of the own vehicle 10a, i.e. in the direction to outside from the windshield glass 12 of the own vehicle 10a. That is, the imaging camera 21 captures the forward view image of the own vehicle 10a. It is acceptable for other exemplary embodiments to use a stereo camera instead of such a monocular camera. The millimeter wave radar 22 and the LIDAR 23 are arranged at a front grille 13 in the front side of the own vehicle 10a. The millimeter wave radar 22 uses waves of a millimeter wave band so as to detect presence of an object around the own vehicle 10a, a distance between the own vehicle 10a and the object, a size and shape of the detected object, and a relative speed of the detected object with respect to the own vehicle 10a.

The LIDAR 23 uses a laser beam to detect presence of an object around the own vehicle 10a.

The drive assist device 50 perform various drive control of the own vehicle 10a, for example, an automatic driving and a manual driving of the own vehicle 10a.

The drive assist device 50 has a drive part control device 51, a braking control device 52 and a steering angle control device 53.

The drive part control device 51 controls behavior of the drive part (not shown) for driving vehicle wheels of the own vehicle 10a. It is possible to use at least one of an internal combustion engine and an electric motor as the drive part to drive the vehicle wheels.

The braking control device 52 is an electronically controlled brake (ECB) system, for example. The steering angle control device 53 controls a steering angle of the own vehicle 10a. The steering angle control device 53 is an electronic power steering (EPS) system, for example. The steering angle represents an average steering angle of two front wheels in the four wheels of the own vehicle 10a.

The drive assist control device 300 controls the behavior of the drive assist device 50 on the basis of the detection results of the sensor device 20a. The drive assist control device 300 is composed of an electronic control unit (ECU) having a CPU (not shown), a memory unit (not shown) and an interface (not shown). The ECU executes programs stored in the memory unit so as to realize functions of the drive assist control device.

As shown in FIG. 6, the drive assist control device 300 controls the behavior of the drive assist device 50 on the basis of detection results transmitted from the sensor device 20a. The sensor device 20a has various types of sensors, a speed sensor, a steering angle sensor, a yaw rate sensor mounted on the own vehicle 10a (omitted from the drawings), which are usually used, in addition to the imaging camera 21, the millimeter wave radar 22 and the LIDAR 23.

The drive assist control device 300 does not control the behavior of the drive assist device 50 performing the drive assist of the own vehicle 10a when not receiving at least one of the detection results, two of the detection results, or all of the detection results of these sensors in the sensor device 20a.

In the second exemplary embodiment, the drive assist control device 300 does not control the behavior of the drive assist device 50 when snowfall, etc. accumulated on the roof 11 of the own vehicle 10a has been moved onto the windshield glass 12 because the windshield 12 has been covered with the moved snowfall and the sensor device 201 transmits no detection result to the drive assist control device 300.

The material accumulation detection device 100a according to the second exemplary embodiment is composed of the electronic control unit (ECU). The ECU forming the material accumulation detection device 100a is composed of the central processing unit (CPU) 110, a memory unit 200a, the input/output interface (I/O interface, not shown), etc. The memory unit 200a is composed of a read only memory (ROM), a random access memory (RAM), etc.

As shown in FIG. 6, the ECU as the material accumulation detection device 100a executes programs stored in the memory unit 200a or the non-transitory computer readable storage medium so as to provide functions of an information acquisition part 121, a communication part 122, a detection part 140a and the information control part 150a.

In the material accumulation detection device 100a according to the second exemplary embodiment, the detection part 140a detects that the own vehicle 10a has entered the first state when receiving no detection result transmitted from the sensor device 20a in addition to the first state detection condition of the first exemplary embodiment.

Figure 7:
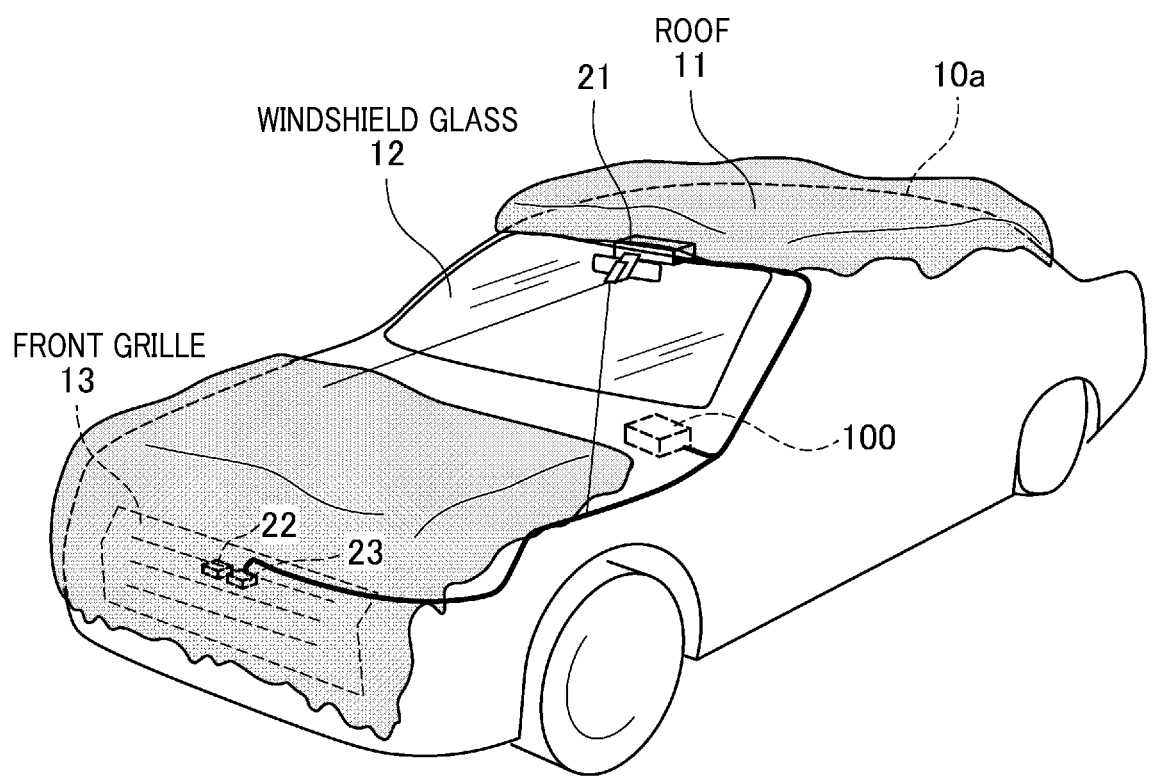
FIG. 7 is a view showing a situation in which snowfall has been accumulated on a roof, a bonnet and a front grille at the front of the own vehicle.

FIG. 7 is a view showing a situation in which snowfall, etc. has been accumulated on the roof 11, the bonnet and the front grille 13 at the front side of the own vehicle 10a. As shown in FIG. 7, the millimeter wave radar 22 and the LIDAR 23 are arranged in the front grille 13 at the front side of the own vehicle 10a. The detection part 140a determines that the own vehicle 10a has entered the first state when receiving no detection result of the front view transmitted from the millimeter wave radar 22 and the LIDAR 23.

It is acceptable for the detection part 140a to determine that the own vehicle 10a has entered the first state when receiving no detection result transmitted from at least one of the imaging camera 21, the millimeter wave radar 22 and the LIDAR 23, or transmitted from two of the imaging camera 21, the millimeter wave radar 22 and the LIDAR 23 or transmitted from all of them.

The information control part 150a instructs the information device 30 to provide a warning to the user of the own vehicle when the detection part 140a detects that the own vehicle 10a has entered the first state.

Further, when the external environment information indicates that there is a possibility in which the roof 11 of the own vehicle 10a has been covered with snow, etc., the information control part 150a instructs the information device 30 to inform, to the user of the own vehicle 10a, the information of there is a risk that the drive assist control of the own vehicle 10a may be cancelled.

In addition to this, it is acceptable for the information control part 150a to instruct the information device 30 to provide, to the user of the own vehicle 10a, a possible situation that the drive assist control of the own vehicle 10a may be cancelled due to the snow accumulation. For example, when detecting that there is a possibility in which snowfall, etc. has been accumulated on the roof 11 of the own vehicle 10a, the detection part 140a instructs the information device 30 to provide a warning information that the sensor device 20a (the imaging camera 21, etc.) cannot acquire an external image due to the situation in which snow, etc. on the roof 11 has been moved by wind and/or its dead weight onto the windshield glass 12 and the windshield glass 12 has covered with snow.

As previously described, because the material accumulation detection device 100a instructs the information device 30 to provide information regarding the possibility of the drive assist control of the own vehicle 10a being cancelled, it is possible for the user of the own vehicle 10a can obtain correct information regarding of a possibility in which the drive assist control of the own vehicle 10a may be cancelled in addition to the effects provided by the material accumulation detection device 10 according to the first exemplary embodiment. For example, when the user of the own vehicle 10a can prepare a countermeasures against when the drive assist control is cancelled, for example, can perform the manual driving when the drive assist control is cancelled.

Furthermore, when receiving the information regarding the possibility of drive assist control of the own vehicle 10a being cancelled, the user of the own vehicle 10a can remove snow from the roof 11 and the windshield glass 12 of the own vehicle 10a before the own vehicle 10a travels. This makes it possible to reduce a possibility that the drive assist control may be cancelled.

According to the material accumulation detection device 100a having the structure previously described according to the second exemplary embodiment, it is possible to use, as the external environment information, the detection results of the sensor device 20a, to be used for performing the drive assist control. This structure makes it possible to reduce the manufacturing cost of the material accumulation detection device 100a.

Third Exemplary Embodiment

A description will be given of a material accumulation detection device 100b and the detection method according to a third exemplary embodiment with reference to FIG. 8 to FIG. 9.

Figure 8:
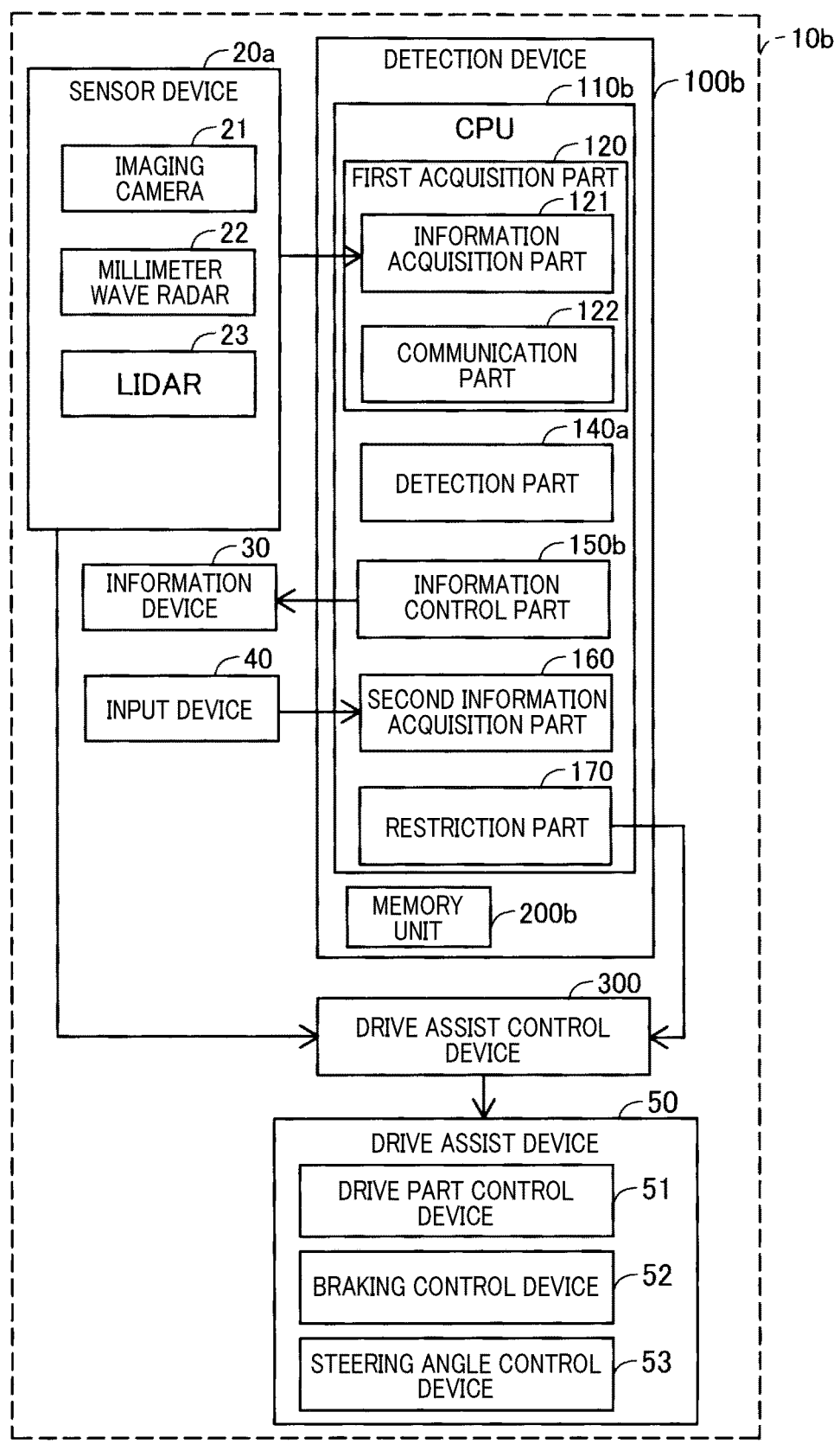
FIG. 8 is a block diagram showing a schematic structure of the material accumulation detection device according to a third exemplary embodiment of the disclosure.

FIG. 8 is a block diagram showing a schematic structure of the material accumulation detection device 100b according to the third exemplary embodiment of the disclosure. The same components between the third exemplary embodiment and the other exemplary embodiments will be referred to the same reference numbers and characters. The explanation of the same components is omitted here for brevity.

As shown in FIG. 8, the material accumulation detection device 100b according to the third exemplary embodiment is mounted on the own vehicle 10b. That is, the own vehicle 10b has the material accumulation detection device 100b, the sensor device 20a, the information device 30, an input device 40, the drive assist control device 300 and the drive assist device 50.

The material accumulation detection device 100b according to the present disclosure is composed of an electronic control unit (ECU). The ECU forming the material accumulation detection device 100b is composed of the central processing unit (CPU) 110, a memory unit 200b, the input/output interface (I/O interface, not shown), etc. The memory unit 200b is composed of a read only memory (ROM), a random access memory (RAM), etc.

As shown in FIG. 8, the ECU as the material accumulation detection device 100b executes programs stored in the memory unit 200b or the non-transitory computer readable storage medium so as to provide functions of the information acquisition part 121, the communication part 122, the detection part 140a and an information control part 150b, a second information acquisition part 160 and a restriction part 170.

The information control part 150b instructs the information device 30 to provide a warning, to the user of the own vehicle 10b, that it is necessary to remove, from the own vehicle 10b, snowfall, etc. accumulated on the own vehicle 10b when the detection part 140a provides the detection result of that the own vehicle 10b has entered the first state.

The second information acquisition part 160 acquires removal information which represents that snow, etc. has been removed from the own vehicle 10b through the input device 40. The input device 40 is composed of a button, a touch panel and an audio input device.

The restriction part 170 instructs the drive assist control device 300 to restrict the drive assist control device 300 from performing the drive assist control when the second information acquisition part 160 does not receive the removal information through the input device 40. The restriction to perform the drive assist control represents that the drive assist control device 300 does not perform the drive assist control of the drive part control device 51, the braking control device 52 and the steering angle control device 53, and instructs the drive part control device 51 and the braking control device 52 to reduce an acceleration of the own vehicle 10b to be not more than a predetermined acceleration.

A description will now be given of the detection process performed by the material accumulation detection device 100b according to the third exemplary embodiment with reference to FIG. 9.

Figure 9:
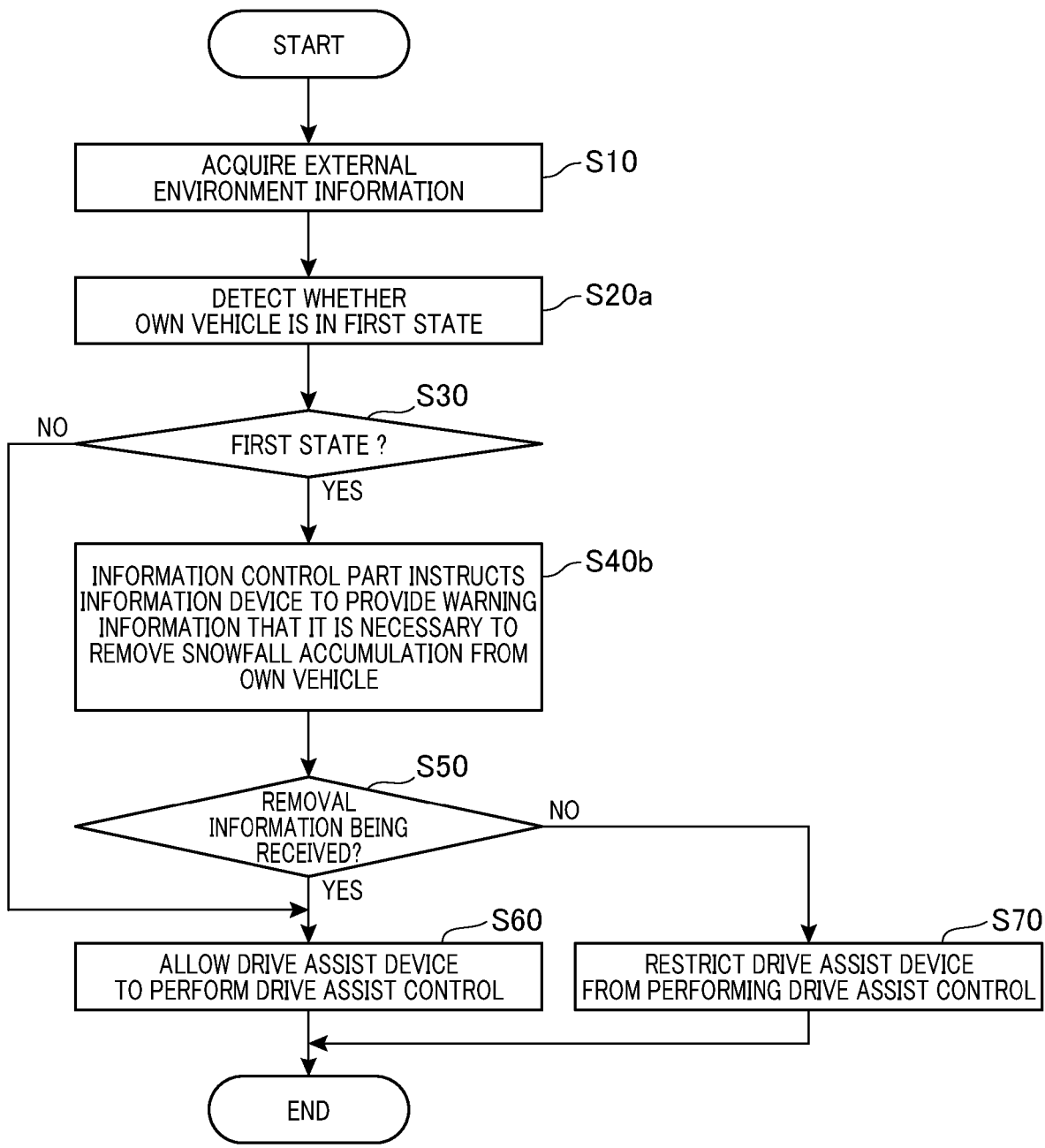
FIG. 9 is a flow chart showing the detection process performed by the material accumulation detection device according to the third exemplary embodiment shown in FIG. 8.

FIG. 9 is a flow chart showing the detection process performed by the material accumulation detection device 100b according to the third exemplary embodiment shown in FIG. 8.

In step S10 shown in FIG. 9, the first acquisition part 120 (which is composed of the information acquisition part 121 and the communication part 122) acquires external environment information. The operation flow progresses to step S20a.

In step S20a, the detection part 140a detects whether the own vehicle 10 has entered the first state on the basis of the acquired external environment information. The operation flow progresses to step S30.

When the detection result in step S30 is positive ("YES" in step S30), i.e. represents that the own vehicle 10 has entered the first state, the operation flow progresses to step S40b.

In step S40b, the information control part 150b instructs the information device 30 to provide a warning information, to the user of the own vehicle 10b, that it is necessary to remove snowfall accumulation, etc. from the own vehicle 10b.

When the detection result in step S30 indicates positive ("YES" in step S30), i.e. represents that the own vehicle 10 has entered the first state, the information control part 150b instructs the information device 30 to provide information that there is a possibility that snowfall, etc. has been accumulated on the own vehicle 10b, and it is necessary to remove snow, etc. from the own vehicle 10b.

When not receiving the forward view image information of the imaging camera 21, it is acceptable for the information control part 150b to instruct the information device 30 to provide, to the user of the own vehicle 10b, information that there is a possibility that snowfall, etc. has been accumulated on the windshield glass 12 of the own vehicle 10b, and it is necessary to remove snow, etc. from the windshield glass 12. Further, it is acceptable for the information control part 150b to instruct the information device 30 to provide information that there is a possibility of restricting or prohibiting the execution of the drive assist control.

Still further, when not receiving detection results regarding forward information transmitted from the millimeter wave radar 23 and the LIDAR 23, it is acceptable for the information control part 150b to instruct the information device 30 to provide information that there is a possibility that snowfall, etc. has been accumulated on the front grille 13 at the front side of the own vehicle 10b, and it is necessary to remove snow, etc. from the front grille 13.

Still further, when it is detected that the own vehicle 10 has entered the first state on the basis of the external environment information acquired by the communication part 122, it is acceptable for the information control part 150b to instruct the information device 30 to provide information that there is a possibility that snowfall, etc. has been accumulated on the roof 11 of the own vehicle 10b, and it is necessary to remove snow, etc. from the roof 11. It is further acceptable for the information control part 150b to instruct the information device 30 to provide the information that there is a possibility of restricting or prohibiting the execution of the drive assist control.

In step S40b shown in FIG. 9, the information control part 150b encourages the user of the own vehicle 10b to input the information that snowfall accumulation, etc. has been removed from the own vehicle 10b. For example, it is possible for the information control part 150b to use audio or display image so as to encourage the user of the own vehicle 10b to input the removal information "Please push a removal recognition button when you have finished the removal of snow. The operation flow progresses to step S50.

In step S50, when receiving the removal information from the input device 40 ("YES" in step S50), the operation flow progresses to step S60.

In step S60, the second information acquisition part 160 transmits an allowance signal to the drive assist control device 300. The allowance signal instructs the drive assist control device 300 to perform the drive assist control of the drive assist device 50. In other words, the allowance signal does not restrict or prohibit the execution of the drive assist control of the drive assist device 50. In the third exemplary embodiment, when receiving the removal information from the input device 40 ("YES" in step S50), the second information acquisition part 160 stores the reception of the removal information and a received time into the memory unit 200b.

On the other hand, when the removal information is not received from the input device 40 ("NO" in step S50), the CPU 110*b* repeatedly the detection in step S50 for a predetermined time length. After the predetermined time length has elapsed without receiving the removal information, the operation flow progresses to step S70.

In step S70, the restriction part 170 transmits a restriction signal to the drive assist control device 300. The restriction signal instructs the drive assist control device 300 to restrict or prohibit the execution of the drive assist control of the own vehicle 10*b*. It is acceptable for the CPU 110*b* to cancel the restriction signal when receiving the removal information after the operation flow has progressed to step S70.

As previously described, in the structure of the material accumulation detection device 100*b* according to the third exemplary embodiment, because the material accumulation detection device 100*b* restricts the drive assist control device 300 from performing the drive assist control when the user of the own vehicle 10*b* finds it difficult to perform safe driving of the own vehicle 10*b* due to snowfall accumulation on the own vehicle 10*b* without removing the snow from the own vehicle 10*b*, it is possible for the material accumulation detection device 100*b* according to the third exemplary embodiment to provide improved safe driving of the own vehicle 10*b* in addition to the effects of the material accumulation detection device 100*a* according to the second exemplary embodiment.

In the structure of the material accumulation detection device 100*b* according to the third exemplary embodiment, because the removal information, which represents that snow, etc. has been removed from the own vehicle 10*b*, is stored in the memory unit 200*b*, it is possible for the detection part 140*a* to read and obtain the removal information stored in the memory unit 200*b*. For example, the detection part 140*a* obtains the previous removal information, and instructs the communication part 122 to obtain the external environment information at a time counted from a predetermined elapsed time length after the snow, etc. has been removed at the previous timing. The detection part 140*a* can detect whether the own vehicle 10*b* is still in the first state on the basis of the currently-obtained external environment information currently obtained through the communication part 122. This structure makes it possible to improve detection accuracy of the detection part 140*a*. Further, it is possible for the detection part 140*a* to calculate a relationship between the driving performance of the own vehicle 10*b* and the condition of the own vehicle 10*b* from which materials such as snowfall, etc. have been removed on the basis of the drive history of the own vehicle 10*b* when the removal information has been stored in the memory unit 200*b* and the drive history of the own vehicle 10*b* when no removal information is stored in the memory unit 200*b*.

Fourth Exemplary Embodiment

A description will be given of a material accumulation detection device 100*c* and the detection method according to a fourth exemplary embodiment with reference to FIG. 10, FIG. 11 and FIG. 12.

Figure 10:
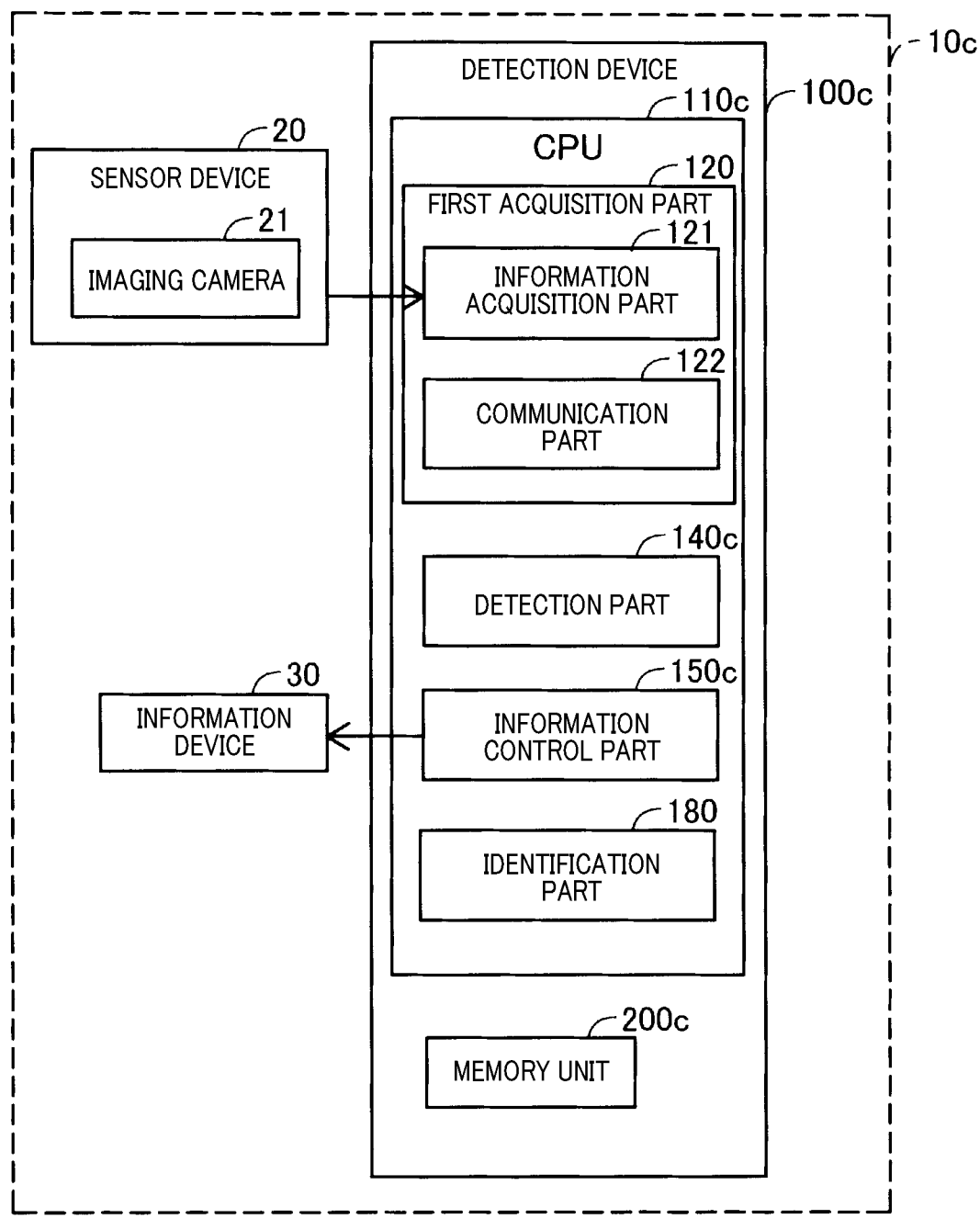
FIG. 10 is a block diagram showing a schematic structure of the material accumulation detection device according to a fourth exemplary embodiment of the disclosure.

FIG. 10 is a block diagram showing a schematic structure of the material accumulation detection device 100*c* according to the fourth exemplary embodiment of the disclosure. The same components between the fourth exemplary embodiment and the other exemplary embodiments will be referred to the same reference numbers and characters. The explanation of the same components is omitted here for brevity.

As shown in FIG. 10, the material accumulation detection device 100*c* according to the third exemplary embodiment is mounted on the own vehicle 10*c*. That is, the own vehicle 10*c* has the material accumulation detection device 100*c*, the sensor device 20 and the information device 30.

The material accumulation detection device 100*c* according to the fourth exemplary embodiment is composed of the electronic control unit (ECU). The ECU forming the material accumulation detection device 100*c* is composed of the central processing unit (CPU) 110, the memory unit 200, the input/output interface (I/O interface, not shown), etc. The memory unit 200 is composed of a read only memory (ROM), a random access memory (RAM), etc.

As shown in FIG. 10, the ECU as the material accumulation detection device 100*c* executes programs stored in the memory unit 200*c* or the non-transitory computer readable storage medium so as to provide functions of the information acquisition part 121, the communication part 122, the detection part 140*c* and the information control part 150*c*, an identification part 180.

In the fourth exemplary embodiment, the memory unit 200*c* has stored parking space information in a parking lot. That is, the parking space information provides useful information regarding an identified parking space in the parking lot which avoids the own vehicle 10*c* from entering the first state when the own vehicle 10*c* stops at the identified parking space.

The detection part 140*c* detects whether the own vehicle 10*c* will enter the first state within a predetermined period after the own vehicle 10*c* stops at the identified parking space, in addition to the detection process explained in the first exemplary embodiment.

When a system stop instruction is generated in the own vehicle 10*c*, or when the user of the own vehicle 10*c* turns off the start switch of the system, the detection part 140*c* detects whether the own vehicle 10*c* will enter the first state at a next system start time on the basis of the external environment information, for example, an estimated amount of snow fall and an estimated temperature in a predetermined period obtained by the communication part 122. It is acceptable for the detection part 140*c* to use the predetermined period to a next system start time.

It is acceptable for the detection part 140*c* to estimate the next system start time on the basis of past drive history of the own vehicle 10*c* stored in the memory unit 200*c*. It is acceptable for the user of the own vehicle 10*c* to provide the predetermined period through the input device 40 shown in the structure of the own vehicle 10*b* equipped with the material accumulation detection device 100*b* according to the third exemplary embodiment.

The identification part 180 refers parking space information regarding the parking lot stored in the memory unit 200*c*, and identifies a parking space of the own vehicle 10*c* so as to avoid the own vehicle 10*c* from entering the first state within the predetermined period. That is, the identification part 180 receives position information of the own vehicle 10*c* transmitted from the GNSS sensor (not shown), and identifies a position closest to the current position of the own vehicle 10*c* and a parking space located within a predetermined distance measured from the own vehicle 10*c*.

The information control part 150*c* instructs the information device 30 to provide, to the user of the own vehicle 10*c*, information that the own vehicle 10*c* will enter the first state within the predetermined period, and information regarding the identified parking space in addition to the information explained in the first exemplary embodiment.

A description will be given of the detection process performed by the material accumulation detection device 100c according to the fourth exemplary embodiment with reference to FIG. 11.

Figure 11:
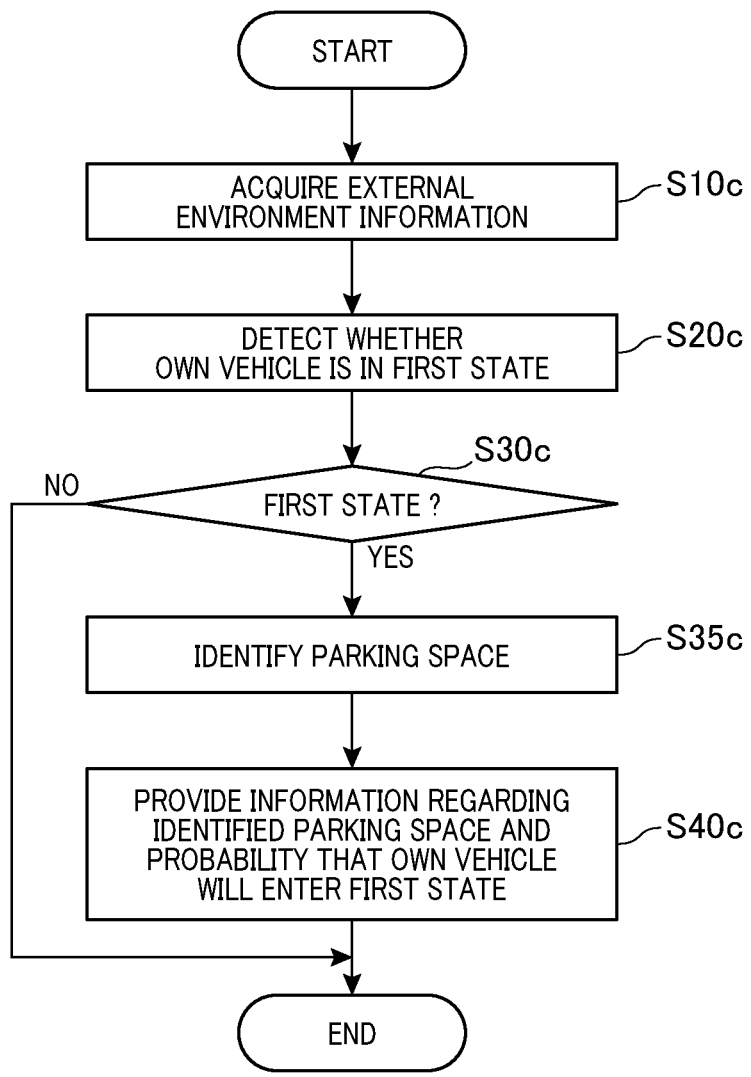
FIG. 11 is a flow chart showing the detection process performed by the material accumulation detection device according to the fourth exemplary embodiment shown in FIG. 10.

FIG. 11 is a flow chart showing the detection process performed by the material accumulation detection device 100c according to the fourth exemplary embodiment shown in FIG. 10.

When the system stop instruction is generated in the own vehicle 10c, or when the user of the own vehicle 10c turns off the start switch of the system, the CPU 110c starts the detection process according to the fourth exemplary embodiment.

It is acceptable for the CPU 110c to start the detection process when a navigation system (not shown) mounted on the own vehicle 10c has been activated, and the own vehicle 10c has travelled by a predetermined distance measured from a target place, or when a predetermined time has elapsed in an estimated time period to reach the target place.

In step S10c shown in FIG. 11, when the first acquisition part 120c (which is composed of the information acquisition part 121 and the communication part 122) acquires external environment information during the predetermined period, the operation flow progresses to step S20c.

In step S20c, the detection part 140c detects whether the own vehicle 10 will enter the first state within the predetermined period on the basis of the acquired external environment information.

When the detection result in step S30c indicates positive ("YES" in step S30c), i.e. represents that the own vehicle 10c will enter the first state within the predetermined period, the operation flow progresses to step S35c.

In step S35c, the identification part 180 refers and obtains the parking space information regarding the parking lot stored in the memory unit 200c, and identifies a parking space of the own vehicle 10c so as to avoid the own vehicle 10c from entering the first state within the predetermined period on the basis of the obtained parking space information. The identification part 180 identifies the parking space of the own vehicle 10c located in the inside of a garage in the parking lot, not located on the roof of the garage in the parking space so as to avoid the own vehicle suffering snowfall, etc. on the roof 11, the windshield 12 of the own vehicle 10c.

When material derived from the external environment is snow and the own vehicle 10c is located on the Northern Hemisphere, it is acceptable to identify a parking space located at the south side of a building. When the own vehicle 10c is located on the Southern Hemisphere, it is acceptable to identify a parking space located at the north side of a building. It is acceptable for the identification part 180 to identify a parking space located in a shadow of a building so as to shield the own vehicle from wind, and/or to avoid the own vehicle from damage of snowfall, etc. at the parking space.

It is acceptable for the identification part 180 to communicate with external servers and a traffic infrastructure, for example, an intelligence road traffic infrastructure so as to obtain parking space information.

Figure 12:
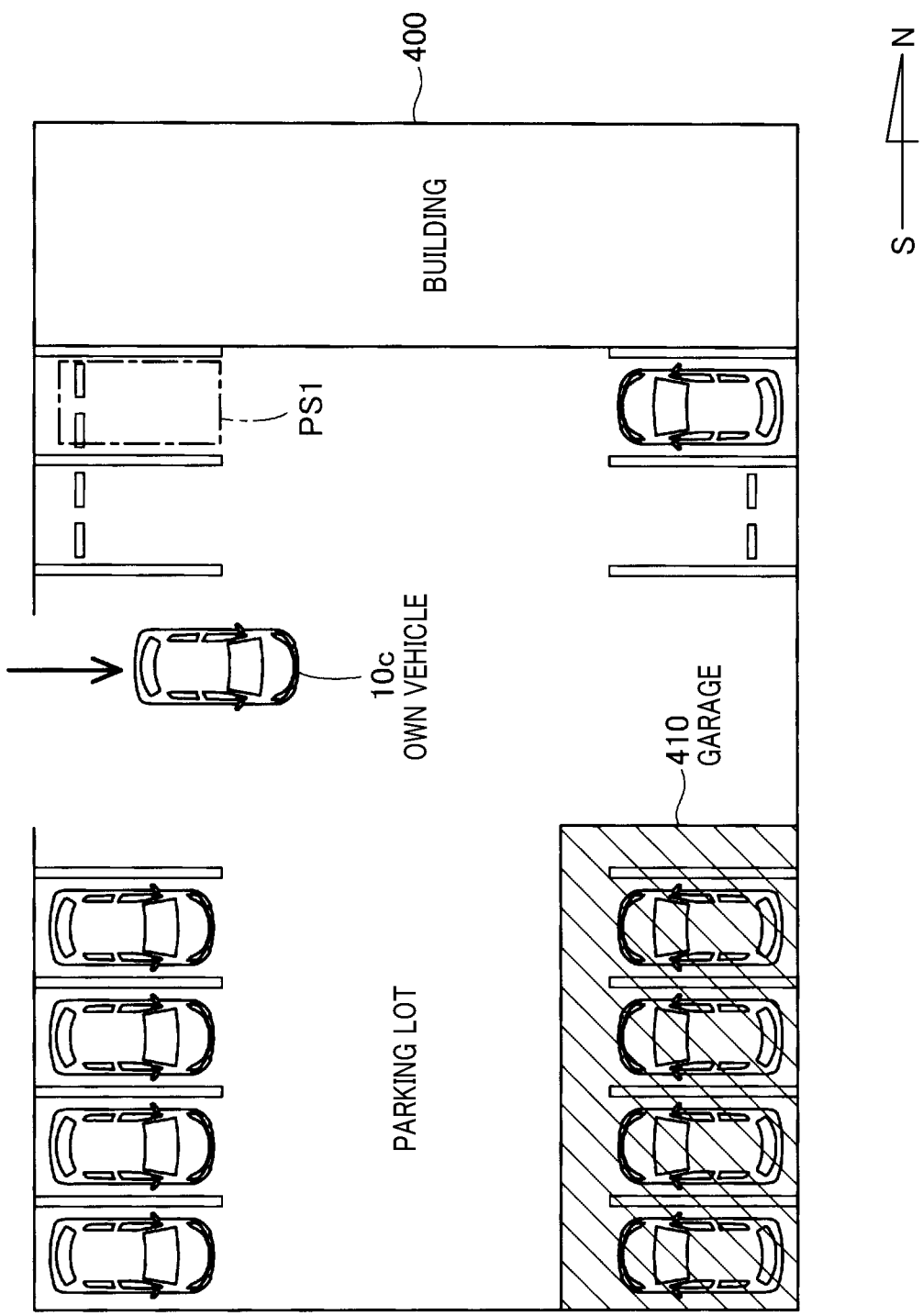
FIG. 12 is a view showing in an identified parking space of the own vehicle in a parking lot.

FIG. 12 is a view showing in an identified parking space PS1 of the own vehicle 10c in a parking lot. As shown in FIG. 12, it is possible for the identification part 180 to identify the parking space PS1 located at a south side of a building 400 when there is no parking space in the garage 410 in the parking lot. The operation flow progresses to step S40c.

In step S40c, when the identification part 180 has identified the parking space in the parking lot, the information control part 150c instructs the information device 30 to provide a warning that there is a possibility for the own vehicle 10c entry to the first state, and to provide the parking space information to the user of the own vehicle 10c.

In the structure of the material accumulation detection device 100c according to the fourth exemplary embodiment, the detection part 140c detects whether the own vehicle 10c will enter the first state within the predetermined period after the vehicle stop. The information control part 150c instructs the information device 30 to provide a warning that the own vehicle 10c will enter the first state in a future. Accordingly, it is possible for the user of the own vehicle 10c to receive the warning regarding the possibility that it is difficult for the user of the own vehicle 10c to drive the own vehicle 10c due to snow accumulation before the start of the system of the own vehicle 10c.

In the structure of the material accumulation detection device 100c according to the fourth exemplary embodiment, the identification part 180 identifies the parking space of the own vehicle 10c so as to avoid the own vehicle 10c from entering the first state. The information control part 150c instructs the information device 30 to provide parking space information regarding the identified parking space to the user of the own vehicle 10c so as to avoid the own vehicle 10c from entering the first state. Accordingly, it is possible for the user of the own vehicle 10c to receive the identified parking space so as to avoid the own vehicle 10c from entering the first state. This makes it possible to allow the user of the own vehicle 10 to smoothly make countermeasure, for example, to park the own vehicle in the identified parking space so as to avoid the own vehicle 10c from entering the first state.

Fifth Exemplary Embodiment

A description will be given of a material accumulation detection device 100d and the detection method according to a fifth exemplary embodiment with reference to FIG. 13.

Figure 13:
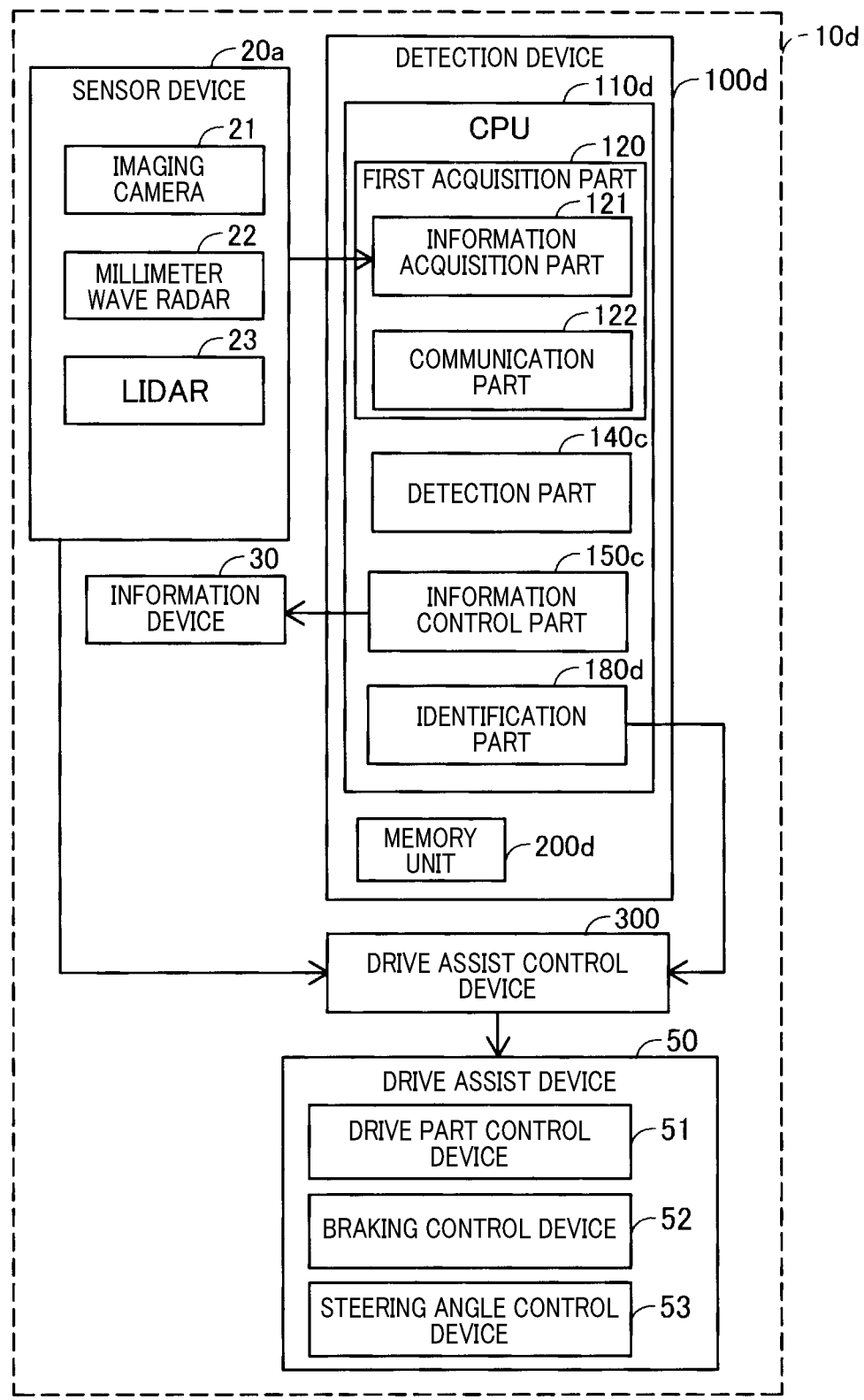
FIG. 13 is a block diagram showing a schematic structure of the material accumulation detection device according to a fifth exemplary embodiment of the disclosure.

FIG. 13 is a block diagram showing a schematic structure of the material accumulation detection device 100d according to the fifth exemplary embodiment of the disclosure. The same components between the fifth exemplary embodiment and the other exemplary embodiments will be referred to the same reference numbers and characters. The explanation of the same components is omitted here for brevity.

As shown in FIG. 13, the material accumulation detection device 100d according to the fifth exemplary embodiment is mounted on the own vehicle 10d. That is, the own vehicle 10d has the material accumulation detection device 100d, the sensor device 20a, the information device 30, the drive assist device 50 and the drive assist control device 300. The drive assist control device 300 controls the behavior of the drive assist device 50.

The material accumulation detection device 100d according to the fifth exemplary embodiment is composed of the electronic control unit (ECU). The ECU forming the material accumulation detection device 100d is composed of a central processing unit (CPU) 110d, a memory unit 200d, the input/output interface (I/O interface, not shown), etc. The memory unit 200s is composed of a read only memory (ROM), a random access memory (RAM), etc.

As shown in FIG. 10, the ECU as the material accumulation detection device 100d executes programs stored in the memory unit 200d or the non-transitory computer readable storage medium so as to provide functions of a first acquisition part 120, the detection part 140c, the information control part 150c and an identification part 180d. The first acquisition part 120 has the information acquisition part 121 and the communication part 122. Similar to the memory unit 200c used in the fourth exemplary embodiment previously described, the memory unit 200d stores the parking space information, etc.

Similar to the identification part 180d used in the fourth exemplary embodiment previously described, the identification part 180d refers parking space information regarding the parking lot stored in the memory unit 200d, and identifies a parking space of the own vehicle 10c so as to avoid the own vehicle 10c from entering the first state within the predetermined period. That is, the identification part 180d receives position information of the own vehicle 10d transmitted from the GNSS sensor (not shown), and identifies a position closest to the current position of the own vehicle 10d and a parking space located within the predetermined distance measured from the own vehicle 10d. In addition, the identification part 180d transmits an instruction signal to the drive assist control device 300 so as to park the own vehicle at the identified parking space. When receiving the instruction signal transmitted from the identification part 180d, the drive assist control device 300 controls the drive part control device 51, the braking control device 52 and the steering angle control device 53 in the drive assist device 50 so as to move the own vehicle 10d to the identified parking space, and to park the own vehicle 10d at the identified parking space.

The drive assist control device 300 used in the fifth exemplary embodiment corresponds to a parking execution part.

In the structure of the material accumulation detection device 100d according to the fifth exemplary embodiment, because it is possible to park the own vehicle 10d at the identified parking space so as to avoid the own vehicle 10d suffering snowfall, it is possible for the user of the own vehicle 10d to perform safe driving at the next time.

Other Modifications

The concept of the present disclosure is not limited by the first to fifth exemplary embodiments previously described. It is possible for the present disclosure to have various modifications.

First Modification

It is possible for each of the first to fifth exemplary embodiments to use, as the information device 30, various types of external devices, for example an external display device and speakers installed outside devices of the own vehicles 10 to 10d. Specifically, it is acceptable for the information control parts 150, 150a and 150c to execute various application programs stored in a memory of a mobile phone of the user of the own vehicles 10 to 10d so as to provide information and a warning on a display and through a speaker in the mobile phone. For example, when the own vehicle 10 to 10d is a shared vehicle, it is acceptable for the information control parts 150, 150a and 150c to transmit various information and warning to an information device 30 arranged in a car-sharing control center. It is acceptable to use a vehicle, as the own vehicle 10 to 10d, the behavior of which is controlled by a remote-control system so as to start the system of the own vehicle and to turn on/off the switch of the system of the own vehicle. The structure of the first modification makes it possible for the user of the own vehicles 10 to 10d to obtain correct information that the own vehicle has entered or will enter the first state without visibility.

Second Modification

In the structure of the third exemplary embodiment previously described, it is acceptable to use, as the input device 40, buttons, a touch panel, an audio input device installed in external devices of the own vehicle 10b. For example, it is acceptable to execute various application programs stored in a memory of a mobile phone of the user of the own vehicle and to use a touch panel and a speaker of the mobile phone of the user of the own vehicle.

Third Modification

It is acceptable for the material accumulation detection device according to the first to third exemplary embodiments to repeatedly perform the detection process every predetermined intervals during a period counted from a time when the start of the system in the own vehicle 10, 10a, 10b to a time of the system stop, or during a period counted from a time when a start switch is turned on to a time when the start switch is turned off. Because this structure makes it possible to provide information to the user of the own vehicle when the own vehicle has entered the first state due to snowfall accumulation, it is possible to provide a warning to the user (driver) of the own vehicle which is running.

Fourth Modification

In the structure of the third exemplary embodiment previously described, it is acceptable to store removal information, regarding removed materials (i.e., snowfall, frozen water, ash, sand (sand particles, sand powder), etc.) derived from external environment, into a memory unit in an external server located outside of the own vehicle 10b through a communication network.

Fifth Modification

In the structure of the fourth and fifth exemplary embodiments previously described, it is acceptable to store parking space information into an external server located outside of the own vehicle and to communicate with the own vehicle. In this case, it is acceptable for the identification part 180, 180d to acquire the parking space information stored in the external server through a communication network.

Sixth Modification

In the structure of the fourth exemplary embodiment previously described, the material accumulation detection device 100c has the identification part 180, and the information control part 150c instructs the information device 30 to provide, to the user of the own vehicle 10c, the information that the own vehicle 10c will enter the first state within the predetermined period, and the information regarding the identified parking space.

However, the concept of the present disclosure is not limited by this structure. For example, it is acceptable for the material accumulation detection device 100c to perform the detection process without using the identification part 180, and acceptable for the information control part 150c to instruct the information device 30 to provide, to the user of the own vehicle 10c, the information that the own vehicle 10c will enter the first state within the predetermined period. In this structure, because the detection part 140c detects whether the own vehicle 10c will enter the first state within the predetermined period after the own vehicle 10c has stopped and the information control part 150c instructs the information device 30 to provide, to the user of the own vehicle 10c, the information that the own vehicle 10c will enter the first state within the predetermined period, this makes it possible for the user of the own vehicle 10c to obtain correct information regarding a risk that the user of the own vehicle 10c cannot drive the own vehicle 10c before the next start of the system of the own vehicle 10c due to snowfall accumulation, etc.

Seventh Modification

It is preferable to apply the material accumulation detection device according to the first to fifth exemplary embodiments and the modifications to sharing car shop and offices using a plurality of the own vehicles 10 to 10d. For example, in a situation in which the own vehicles 10c and 10d have been reserved and the weather information predicts that the own vehicles will enter the first state tomorrow, a manager of the shop or office can park the own vehicles at the parking spaces in a parking lot identified by the identification part 180, 180d. This structure makes it possible to correctly park the own vehicles at the identified parking spaces so as to take measures in preparation for the weather tomorrow, even if the parking lot has a limited number of parking spaces so as to avoid the own vehicles from entering the first state.

Eighth Modification

It is possible to combine the structures of the material accumulation detection devices according to the first to fifth exemplary embodiments and modifications thereof. For example, it is possible to combine the structure of the material accumulation detection device 100a according to the second exemplary embodiment and the structure of the material accumulation detection device 100c according to the fourth exemplary embodiment.

In order to realize the concept of the present disclosure, it is acceptable to use the detection method for detecting accumulation of material, for example snowfall, frozen water, ash, sand (sand particles, sand powder), etc. derived from external environment of the own vehicle 10 to 10d, on the own vehicle 10 to 10d.

Further, it is acceptable to use software programs so as to realize the functions of the detection method according to the present disclosure.

Further, it is acceptable to use a non-transitory computer readable storage medium as the memory unit 200 to 200 for storing these software programs.

Still further, it is acceptable to use a system including the material accumulation detection device 100 to 100d, the sensor device 20, 20a, the information device 30 and the input device 40.

Still further, it is acceptable to use the vehicle 10 to 10d equipped with the material accumulation detection device 100 to 100d.

Furthermore, it is acceptable to use hardware devices so as to realize a part or overall of the functions of the software programs used in the material accumulation detection device 10 to 10d.

It is further acceptable to use software programs so as to realize a part or overall of the hardware devices so as to realize the functions of the material accumulation detection device 10 to 10d.

For example, it is acceptable to use, as the hardware devices, one or more semiconductor integrated circuits, discrete semiconductor circuits and circuit modules composed of a combination thereof.

It is further possible to provide a non-transitory computer readable storage medium for storing the software programs (or computer programs) so as to realize a part or overall of the functions of the material accumulation detection device 10 to 10d according to the present disclosure. There are various types of non-transitory computer readable storage mediums, portable memory mediums such as flexible discs, compact disc read only memory (CD-ROM), a memory device in a computer such as a random access memory (RAM), a read only memory (ROM), etc. and a hard disk device as an external memory device mounted on a computer system. That is, the non-transitory computer readable storage medium represents various types of computer readable storage medium.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A material accumulation detection device, to be mounted on a vehicle equipped with an information device, detecting accumulation of materials derived from external environment outside of the vehicle, comprising a computer system including a central processing unit and a drive assistance control device,
the computer system being configured to provide:
a first acquisition part acquiring external environment information outside of the vehicle, the external environment information including detection results acquired from a sensor device mounted on the vehicle;
a detection part detecting whether the vehicle has entered a first state on the basis of the acquired external environment information, the first state representing an accumulation of material on the vehicle which prevents the vehicle from performing smooth driving, and the material being derived from an external environment of the vehicle;
an information control part instructing the information device to provide information that the vehicle has entered the first state,
a second information acquisition part that acquires removal information which represents that the materials have been removed from the vehicle,
wherein the first state includes a state in which the first acquisition part does not acquire the detection results of the sensor device; and
a restriction part that instructs the drive assist control device to restrict the drive assist of the vehicle when the vehicle has entered the first state and the second information acquisition part acquires no removal information.

2. The material accumulation detection device according to claim 1, wherein the detection part detects the first state based on the external environmental information acquired from the first acquisition part, the first state representing a situation in which there is a possibility that the accumulation of the material accumulated on a roof of the vehicle moves from the roof onto a windshield glass of the vehicle such that a front direction of the camera is covered with the material.

3. The material accumulation detection device according to claim 1, further comprising a memory unit storing the acquired removal information.

4. The material accumulation detection device according to claim 1, wherein
the detection part detects whether the vehicle will enter the first state within a predetermined period after the vehicle has stopped, and
the information control part instructs the information device to provide information that the vehicle will enter the first state within the predetermined period.

5. The material accumulation detection device according to claim 2, wherein
the detection part detects whether the vehicle will enter the first state within a predetermined period after the vehicle has stopped, and
the information control part instructs the information device to provide information that the vehicle will enter the first state within the predetermined period.

6. The material accumulation detection device according to claim 4, further comprising an identification part identifying a parking space so as to avoid the own vehicle from entering the first state within the predetermined period,
wherein the information control part instructs the information device to provide information regarding identified parking space information.

7. The material accumulation detection device according to claim 5, further comprising an identification part identifying a parking space so as to avoid the vehicle from entering the first state within the predetermined period,
wherein the information control part instructs the information device to provide information regarding identified parking space information.

8. The material accumulation detection device according to claim 4, further comprising an identification part identifying a parking space so as to avoid the vehicle from entering the first state within the predetermined period,
wherein the drive assist control device performs as a parking execution part which instructs the vehicle to move to the identified parking space and park at the identified parking space.

9. The material accumulation detection device according to claim 5, further comprising an identification part identifying a parking space so as to avoid the vehicle from entering the first state within the predetermined period,
wherein the drive assist control device performs as a parking execution part which instructs the vehicle to move to the identified parking space and park at the identified parking space.

10. A detection method detecting accumulation of materials derived from external environment outside of a vehicle equipped with an information device, comprising steps of:
acquiring external environment information outside of the vehicle, the external environment information including detection results acquired from a sensor device mounted on the vehicle;
detecting whether the vehicle has entered a first state on the basis of the acquired external environment information, the first state representing an accumulation of material which prevents the vehicle from performing smooth driving, and the material being derived from an external environment of the vehicle;
instructing the information device to provide information that the vehicle has entered the first state;
acquiring removal information which represents that materials have been removed from the vehicle,
wherein the first state includes a state in which the results of the sensor device are not acquired; and
instructing a drive assistance control to restrict driving assist of the vehicle when the vehicle has entered the first state and no removal information is requested.

* * * * *